Patented Apr. 11, 1933

1,903,553

UNITED STATES PATENT OFFICE

MARION H. PARTRICK AND KATHERYN B. CURTIS, OF TAMPA, FLORIDA

PROCESS FOR SHREDDING PALMETTO AND PRODUCT PRODUCED THEREBY

No Drawing.   Application filed September 30, 1930.   Serial No. 485,561.

This invention relates to a product especially adapted for use as a stuffing or filling for stuffing upholstered furniture, cushions, pillows, or other commodities which may require a fibrous filling.

Another object of this invention is the production of an efficient stuffing or filling produced from the leaves or fronds or foliage of palmetto cabbage, palmetto saw, palmetto scrub, and palms of all varieties.

A still further object of this invention is the production of a process for producing the above mentioned product.

Other objects and advantages of the present invention will appear throughout the following specification and claim.

In carrying out the invention which has been set forth in a general way in the foregoing, we preferably employ the leaves or fronds of American grown palmetto cabbage, palmetto saw, palmetto scrub, and palms of all varieties and it should be borne in mind that only the leaves or fronds or foliage of the plant are used in the process for producing the desired product and not the stems or stalks.

The palms are shredded in their green state, as soon after cutting as possible and in carrying out the process for producing the desired product, the palm leaves or foliage are first stripped of all bark or skin, or this bark or skin may be removed in any suitable or desired manner, which bark or skin is rejected and only the fibrous parts of the foliage retained.

The fibrous parts of the foliage are then shredded in their green state and after this shredding process the foliage is then dried by placing the same in the sunshine for a period of approximately three hours.

At this stage the product has an odor similar to that of new mown hay, which may be found objectionable and in order to remove this odor the product is deodorized by treating the same with cedar oil or cedar sawdust or shavings or other suitable material of desired fragrance, which treatment will not only remove the objectionable odor, but leaves the fiber impregnated with a pleasing fragrance.

After the product has been produced by following out the process as above outlined, the product may then be marketed and is adapted for use for the purpose of stuffing in the manufacture of upholstered furniture, cushions, pillows, and other articles wherein a fibrous stuffing is desired. The product is especially adapted for use in upholstering automobiles.

The product above described and produced by the process set forth will produce an efficient stuffing or filler which will not become packed or lumpy, but will present a soft, pliable and sturdy filler for cushions which are subjected to hard usage.

It is further desired to point out that applicants' product is preferably formed by shredding, cutting, stripping and generally disintegrating the American grown leaves, fronds or foliage of palms of all varieties.

Having described the invention, what is claimed is:—

The process of producing a stuffing of the class described consisting of, first stripping the bark and skin from the green foliage of the American grown palm, second shredding the remaining fibrous material in its green state, third subjecting the shredded fibrous material to a natural drying process for approximately three hours, and fourth impregnating the dried shredded fibrous material with a cedar oil.

In testimony whereof we affix our signatures.

MARION H. PARTRICK.
KATHERYN B. CURTIS.